(12) United States Patent
Robinson et al.

(10) Patent No.: US 10,429,188 B2
(45) Date of Patent: Oct. 1, 2019

(54) WAREHOUSE MAPPING TOOLS

(71) Applicant: Crown Equipment Corporation, New Bremen, OH (US)

(72) Inventors: Callum Robinson, Auckland (NZ); Amit Philip, Auckland (NZ); Ryan Estep, Auckland (NZ); Lisa Wong, Auckland (NZ)

(73) Assignee: CROWN EQUIPMENT CORPORATION, New Bremen, OH (US)

( * ) Notice: Subject to any disclaimer, the term of this patent is extended or adjusted under 35 U.S.C. 154(b) by 22 days.

(21) Appl. No.: 15/938,460

(22) Filed: Mar. 28, 2018

(65) Prior Publication Data

US 2018/0283872 A1 Oct. 4, 2018

Related U.S. Application Data

(60) Provisional application No. 62/478,970, filed on Mar. 30, 2017.

(51) Int. Cl.
*G01C 21/00* (2006.01)
*G05D 1/02* (2006.01)
(Continued)

(52) U.S. Cl.
CPC ......... *G01C 21/005* (2013.01); *G01C 21/206* (2013.01); *G05D 1/0274* (2013.01); *G06Q 10/08* (2013.01)

(58) Field of Classification Search
CPC .. G01C 21/005; G01C 21/206; G05D 1/0274; G06Q 10/08
See application file for complete search history.

(56) References Cited

U.S. PATENT DOCUMENTS 7,162,338 B2 * 1/2007 Goncalves ............. G01C 21/12
701/23
8,589,012 B2 * 11/2013 Wong ................... G01C 21/206
701/23
(Continued)

FOREIGN PATENT DOCUMENTS

WO 2016191402 A1 12/2016

OTHER PUBLICATIONS

Search Report and Written Opinion dated Jun. 8, 2018 pertaining to International Application No. PCT/US2018/024877.

*Primary Examiner* — Tyler J Lee
(74) *Attorney, Agent, or Firm* — Dinsmore & Shohl LLP

(57) ABSTRACT

Warehouse mapping tools according to the present disclosure comprise a mobile mapping interface and a mobile computing device in communication with the mobile mapping interface. The mobile computing device can be configured to access waypoint data comprising location coordinates of a set of mapping waypoints, present graphical representations of the set of mapping waypoints at discrete locations in a representation of a warehouse environment, access mobile mapping data representing an elapsed travel path, access error metric data, present a graphical representation of the error metric data, and indicate a validation state of the elapsed travel path segment. In other embodiments, a warehouse mapping tool comprises a remote computer that is configured to communicate with a mapping vehicle and that can be used to facilitate navigation, localization, or odometry correction with respect to an industrial vehicle in the warehouse. In still other embodiments, mapping vehicles comprising warehouse mapping tools are provided.

30 Claims, 13 Drawing Sheets

(51) Int. Cl.
    *G06Q 10/08*     (2012.01)
    *G01C 21/20*     (2006.01)

(56)     References Cited

U.S. PATENT DOCUMENTS

| | | | |
|---|---|---|---|
| 9,204,251 B1 * | 12/2015 | Mendelson | G08G 1/14 |
| 9,354,070 B2 * | 5/2016 | Thomson | B66F 9/063 |
| 9,358,975 B1 * | 6/2016 | Watts | B60W 30/04 |
| 2012/0035797 A1 * | 2/2012 | Oobayashi | G05D 1/0214 |
| | | | 701/23 |
| 2012/0323431 A1 * | 12/2012 | Wong | G01C 21/206 |
| | | | 701/25 |
| 2012/0323432 A1 | 12/2012 | Wong et al. | |
| 2013/0297151 A1 | 11/2013 | Castaneda et al. | |
| 2015/0226560 A1 | 8/2015 | Chandrasekar et al. | |
| 2016/0171012 A1 | 6/2016 | Davidson | |
| 2016/0359061 A1 | 12/2016 | William et al. | |
| 2018/0059682 A1 | 3/2018 | Thode | |

* cited by examiner

WAREHOUSE MAPPING TOOLS

CROSS-REFERENCE TO RELATED APPLICATIONS

This application claims the benefit of U.S. Provisional Application Ser. No. 62/478,970, SYSTEM AND METHOD FOR MAP DATA COLLECTION, filed on Mar. 30, 2017.

BACKGROUND

The present disclosure relates to warehouse mapping and, more particularly, to a warehouse mapping tool. For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes.

BRIEF SUMMARY

In accordance with one embodiment of the present disclosure, a warehouse mapping tool comprising a mobile mapping interface and a mobile computing device in communication with the mobile mapping interface is provided. The mobile mapping interface comprises a waypoint display window comprising a graphical representation of at least a portion of a warehouse environment, an error metric indicator, and a validation portal that is configured to transfer "accept" and "reject" commands from a user to the mobile computing device. The mobile computing device is configured to access waypoint data comprising location and heading coordinates of a set of mapping waypoints, present graphical representations of the set of mapping waypoints at discrete locations in the representation of the warehouse environment in the waypoint display window of the mobile mapping interface, access mobile mapping data comprising location and heading coordinates representing an elapsed travel path segment associated with the mobile computing device, the mobile mapping interface, or both, in relation to the warehouse environment, present the elapsed travel path segment in the waypoint display window of the mobile mapping interface, access error metric data representing a comparison of the mobile mapping data and the waypoint data, present a graphical representation of the error metric data at the error metric indicator of the mobile mapping interface, and indicate a validation state of the elapsed travel path segment in the waypoint display window in response to the transfer of the "accept" and "reject" commands to the mobile computing device.

In accordance with another embodiment of the present disclosure, a mapping vehicle comprising a warehouse mapping tool is provided. Warehouse mapping tools according to the present disclosure may comprise a mobile computing device and a mobile mapping interface, which mobile computing device may be integrated with the hardware of a mapping vehicle, or may be a stand-alone mobile computing device that may reside on the mapping vehicle, be hand-held, or be otherwise movable through the warehouse. Contemplated mobile computing devices may comprise their own mapping engine, or may be dependent upon a complementary remote computer comprising a mapping engine for full mapping functionality.

In accordance with yet another embodiment of the present disclosure, a mapping tool comprising a mobile mapping interface and a mobile computing device in communication with the mobile mapping interface is provided. The mobile mapping interface comprises a waypoint display window comprising a graphical representation of at least a portion of an industrial environment, an error metric indicator, and a validation portal that is configured to transfer "accept" and "reject" commands from a user to the mobile computing device. The mobile computing device is configured to access waypoint data comprising location coordinates of a set of mapping waypoints, present graphical representations of the set of mapping waypoints at discrete locations in the representation of the industrial environment in the waypoint display window of the mobile mapping interface, access mobile mapping data representing an elapsed travel path segment associated with a mapping vehicle, the mobile computing device, or the mobile mapping interface in relation to the industrial environment, access error metric data representing a comparison of the mobile mapping data and the waypoint data, present a graphical representation of the error metric data at the error metric indicator of the mobile mapping interface, and indicate a validation state of the elapsed travel path segment in the waypoint display window in response to the transfer of the "accept" and "reject" commands to the mobile computing device.

In accordance with a further embodiment of the present disclosure, a warehouse mapping tool comprises a remote computer configured to communicate with a mapping vehicle. The complementary remote computer comprises a mapping interface and a mapping engine. The mapping interface comprises a waypoint display window comprising a graphical representation of at least a portion of a warehouse environment, an error metric indicator, and a validation portal that is configured to transfer "accept" and "reject" commands from a user to the mapping engine. The complementary remote computer is configured to access waypoint data comprising location and heading coordinates of a set of mapping waypoints, present graphical representations of the set of mapping waypoints at discrete locations in the representation of the warehouse environment in the waypoint display window of the mapping interface, access mobile mapping data comprising location and heading coordinates representing an elapsed travel path segment associated with the mapping vehicle in relation to the warehouse environment, present the elapsed travel path segment in the waypoint display window of the mapping interface, access error metric data representing a comparison of the mobile mapping data and the waypoint data, present a graphical representation of the error metric data at the error metric indicator of the mapping interface, and indicate a validation state of the elapsed travel path segment in the waypoint display window in response to the transfer of the "accept" and "reject" commands.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In mapping a warehouse environment, it may be desirable to map a plurality of waypoints throughout the environment. These waypoints generally correspond to defined site locations within warehouse environment and can be used to couple travel path segments in the warehouse environment. In other words, the waypoints can be used to by the mapping tool of the present disclosure to associate known locations within a warehouse environment with prospective start and end points for a path segment. As will be described in greater detail below, this waypoint data may be uploaded to, a warehouse mapping tool for use in mapping a warehouse environment. These waypoints may be used to define and record available travel path segments between waypoints. Multiple path segments may be combined to form a continuous path segment extending along a series of waypoints, thereby mapping a targeted portion of the warehouse environment, or fully mapping the environment. The travel path segments may extend into adjacent environments to interconnect multiple environments.

Waypoints are generally located at selective positions within a warehouse or other industrial environment to simplify the resulting path segment formed between two waypoints and to minimize the total distance and amount of rotation needed to travel during any given path segment. The industrial environment may further include various obstacles that may include permanent and temporary structures, objects, racks, shelves, columns, walls, storage elements, building members, boundaries, and other physical constructions, as will be apparent to those familiar with industrial environments. Although a warehouse environment is used throughout the present disclosure as the illustrative industrial environment, it should be understood that industrial environments may also be industrial yards, loading docks, or like environments where industrial vehicles are used. As will be described in greater detail below, this environmental data may be uploaded into a warehouse mapping tool, in conjunction with the waypoint data described above, for use in mapping a warehouse environment. Accordingly, the plurality of waypoints and the generated path segments mapped between the waypoints are practically restricted to areas of warehouse environment that are not occupied by warehouse obstacles.

Figure 1:
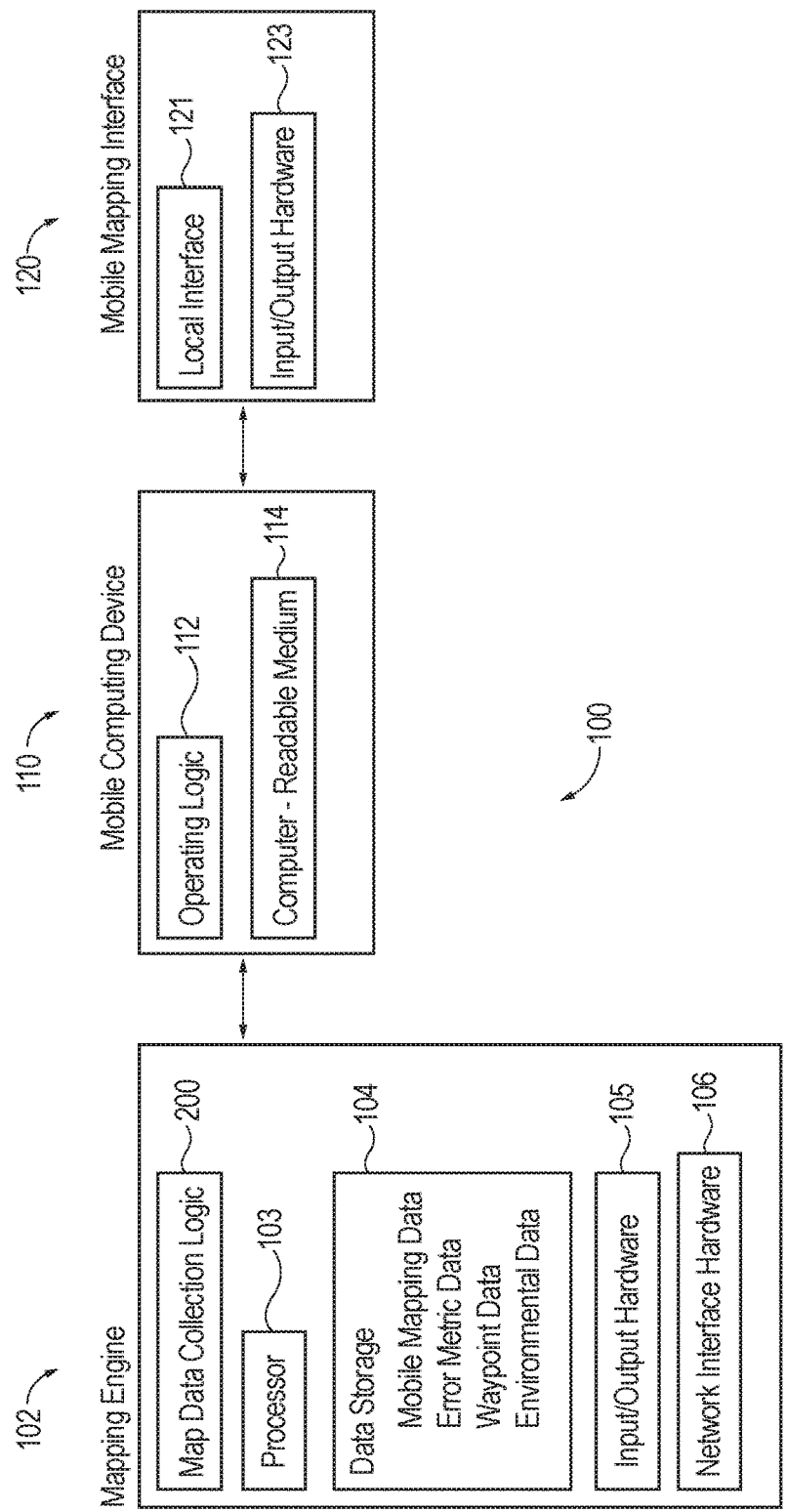
FIG. 1 depicts a schematic diagram of a warehouse mapping tool, including a mapping engine, a mobile computing device and a mobile mapping interface.

FIG. 1 shows a warehouse mapping tool (100) operable to map a warehouse environment with the use of waypoint data and environmental data. Warehouse mapping tool (100) may comprise a mapping engine (102), a mobile computing device (110), and a mobile mapping interface (120) and utilizes suitable software that may be embodied and/or reside in various hardware of the tool, as will be described in greater detail below. By way of example only, warehouse mapping tool (100) is capable of being embodied in one or more of a mapping vehicle, such as a materials handling vehicle, a remote computer, a mobile device, and other various suitable mapping assemblies as will be apparent to those familiar with programmable devices.

Mapping engine (102) may include a data storage (104) that is configured to receive and store the waypoint data and the environmental data described above. Additionally, mapping engine (102) is configured to generate mobile mapping data and error metric data when warehouse mapping tool (100) is integrated with the hardware of a mapping vehicle (50), such that the data storage (104) is operable to further store this dynamic data. As will be described in greater detail below, the mobile mapping data generated by mapping engine (102) may consist of odometry and sensory data of mapping vehicle (50). Mapping engine (102) may further include input/output hardware (105) that is operable to communicatively couple mapping engine (102) to an interface and/or system for operating warehouse mapping tool (100) remotely, as will also be described in greater detail below. Mapping engine (102) may further include map data collection logic (200) (see FIG. 4) that includes operating instructions to perform the mapping function of warehouse mapping tool (100). Accordingly, mapping engine (102) may further include a processor component that is configured to receive and execute the instructions from the map data collection logic (200). In some instances, to communicate the map data collection logic (200) to the other components of warehouse mapping tool (100), mapping engine (102) may include network interface hardware (106) that is configured to transmit said data to mobile computing device (110) and/or mobile mapping interface (120), respectively.

Mobile computing device (110) may include a computer-readable medium (114) that is configured to store the logic commands and/or executable instructions received between mapping engine (102) and mobile mapping interface (120). Accordingly, mobile computing device (110) may further include operating logic (112) that is configured to present, transport, or communicate the temporarily stored data and information from one component of warehouse mapping tool to another throughout the map collection process.

Mobile mapping interface (120) may comprise a local communication interface (121) to facilitate communication among the components of warehouse mapping tool (100), and communication with a user. Mobile mapping interface (120) may further include input/output hardware (123) such that mobile mapping interface (120) is configured to be integrated with various hardware and/or positioning devices. For example, as will be described in greater detail, mobile mapping interface (120) may be integrated with a mapping vehicle (50). In these instances, mobile mapping interface (120) may be integral with mobile computing device (110), mapping engine (102), or both; whereas, in other instances mobile mapping interface (120) may be external and remotely accessible relative to mobile computing device (110), mapping engine (102), or both. Mapping engine (102) can be configured to communicate with mobile computing device (110) and mobile mapping interface (120) through a network connection.

Figure 2:
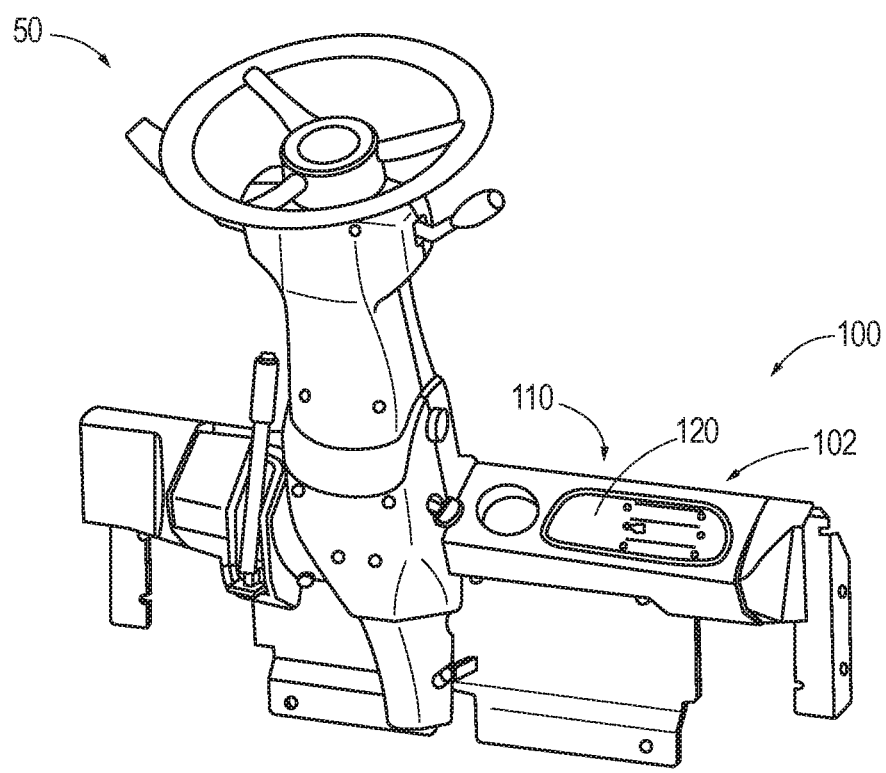
FIG. 2 depicts a perspective view of a portion of a mapping vehicle with a mobile mapping interface integrated with the hardware of the mapping vehicle.

As seen in FIG. 2, warehouse mapping tool (100) may be integrated with a mapping vehicle (50) such that mobile mapping interface (120), and potentially, mapping engine (102), mobile computing device (110), or both, may be integrated with the hardware of mapping vehicle (50). Although not shown, it should be understood that in some embodiments, mapping engine (102), mobile computing device (110), and mobile mapping interface (120) may be permanently or removably attached to mapping vehicle (50) such that warehouse mapping tool (100) is not integrally formed with the hardware of mapping vehicle (50). In the present example, mapping vehicle (50) is a materials handing vehicle, e.g., a lift truck or other materials handling vehicle suitable for use in a warehouse environment; however, it should be understood that mapping vehicle (50) may comprise various other vehicles or devices as will be apparent to those familiar with vehicular technology. As will be described in greater detail below, in some embodiments, mapping vehicle (50) is operable to navigate through warehouse environment (10) while mapping engine (102) performs operating logic (see FIG. 4) to record mobile mapping data of mapping vehicle (50).

It should be understood that mobile computing device (110) and mobile mapping interface (120) are referenced herein as being "mobile" because they are configured to be movable throughout warehouse environment (10) in a continuous, repeatable, and non-destructive manner, under the power of mapping vehicle (50) or a user executing mapping tasks without the aid of a mapping vehicle (50).

Mobile mapping data may comprise location and heading coordinates of mapping vehicle (50), e.g., odometry and sensor data, as vehicle (50) travels between two waypoints (12) in environment (10). As will be described in greater detail below, mapping engine (102) records and analyzes the mobile mapping data received from mapping vehicle (50) in relation to the waypoint data of warehouse environment (10) to confirm a proper path segment (18) is mapped in warehouse environment (10) given the known waypoint (12) locations and warehouse obstacle (14) locations within warehouse (10). Mapping engine (102) uses the collected odometry and sensor data to perform this analysis via a map data collection algorithm, an example of which is described below with reference to FIG. 4. By way of example only, location coordinates of the mobile mapping data may comprise x and y coordinates on a Cartesian system. Heading coordinates represent the angular heading of mapping vehicle (50) relative to warehouse environment (10). In this instance, mobile computing device (110) accesses the mobile mapping data for presentation to a user via mobile mapping interface (120).

Figure 3A:
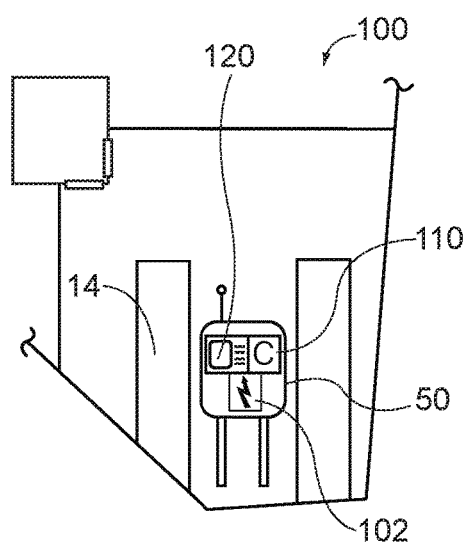
FIG. 3A is a schematic illustration of a warehouse mapping tool configuration where a mobile computing device, a mobile mapping interface, and a mapping engine are secured to, positioned to move with, or integrated with the hardware of a mapping vehicle.
Figure 3B:
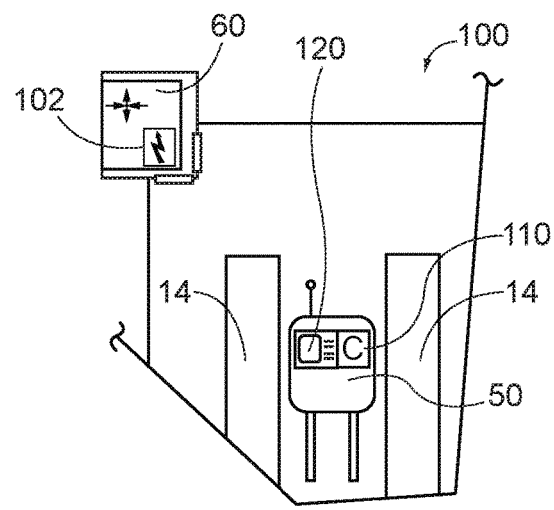
FIG. 3B is a schematic illustration of a warehouse mapping tool configuration where a complementary remote computer comprises a mapping engine.

Although warehouse mapping tool (100) is, in some instances, as being integrated with the hardware of mapping vehicle (50), other embodiments are contemplated. For example, FIGS. 3A-3D, are schematic illustrations of some of the many possible mapping tool configurations covered by the present disclosure and claims. In FIGS. 3A and 3B, the mobile mapping interface (120) and the mobile computing device (110) are integrated with the hardware of the mapping vehicle (50), secured to the mapping vehicle (50), or otherwise positioned to move with the mapping vehicle (50). In FIG. 3A, which illustrates that the concepts of the present disclosure may be embodied entirely in a mapping vehicle, the mapping engine (102) is secured to, integrated with the hardware of, or otherwise positioned to move with the mapping vehicle (50). In FIG. 3B, the mapping engine (102) resides in a complementary remote computer (60).

Figure 3C:
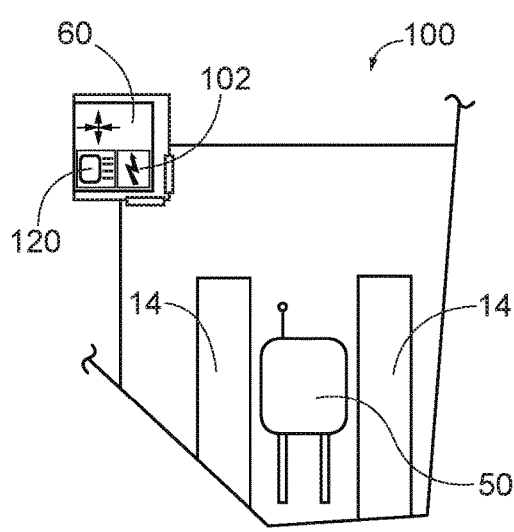
FIG. 3C is a schematic illustration of a warehouse mapping tool configuration where a complementary remote computer comprises a mapping interface and a mapping engine.

As is illustrated schematically in FIG. 3C, warehouse mapping tool configurations according to the present disclosure may utilize a complementary remote computer (60) that comprises mapping interface (120) and mapping engine (102), which is configured to generate the mapping data that is accessed by mapping interface (120). In such embodiments, a mobile computing device would not be required as the functionality of the same would be enabled by the non-mobile mapping interface (120) and mapping engine (102) of the complementary remote computer (60). Complementary remote computer (60) is displaced from mapping vehicle (50) and may be positioned within the warehouse environment or at a location remote from the warehouse environment, so long as it is able to communicate with the mapping vehicle (50). The complementary remote computer (60) can be embodied in a stand-alone programmable computer, or a networked computing system, or may take a variety of similar conventional or yet-to-be developed forms, including those where it is configured to also function as a warehouse management system, the nature of which may be gleaned from conventional or yet-to-be developed teachings on warehouse management systems.

Figure 3D:
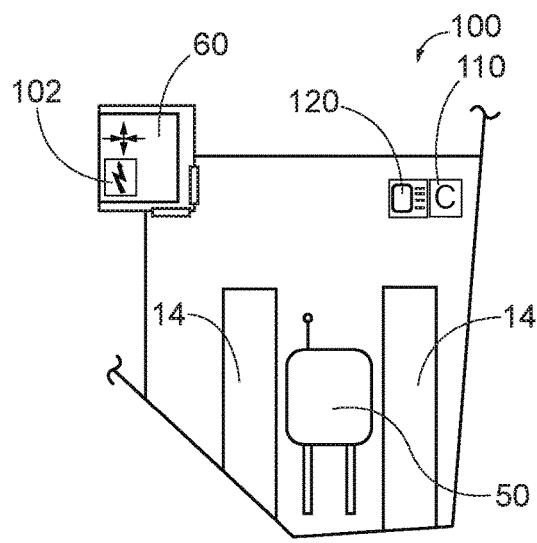
FIG. 3D is a schematic illustration of a warehouse mapping tool configuration where a mobile mapping interface and an associated mobile computing device are displaced from a mapping vehicle and a complementary remote computer comprises a mapping engine.

FIG. 3D is a schematic illustration of mapping tool configuration where mobile mapping interface (120), mobile computing device (110), and mapping engine (102) are displaced from mapping vehicle (50). The mapping engine (102) resides in complementary remote computer (60), which may be configured as a warehouse management system. Mobile computing device (110) and mobile mapping interface (120) may be positioned anywhere in the warehouse environment, as long as that position permits communication with complementary remote computer (60) and mapping vehicle (50). As will be appreciated by those familiar with programmable computing devices and user interfaces, in one embodiment, the collective functionality of mobile computing device (110) and mobile mapping interface (120) may be enabled with conventional, or yet-to-be developed, laptop or tablet computer technology. In this example, mobile mapping interface (120) and mobile computing device (110) may be located anywhere in warehouse environment (10). It should be understood that other configurations and relationships between mapping engine (102), mobile computing device (110), and mobile mapping interface (120) may be included as will be apparent to those practicing the concepts of the present disclosure.

Figure 4:
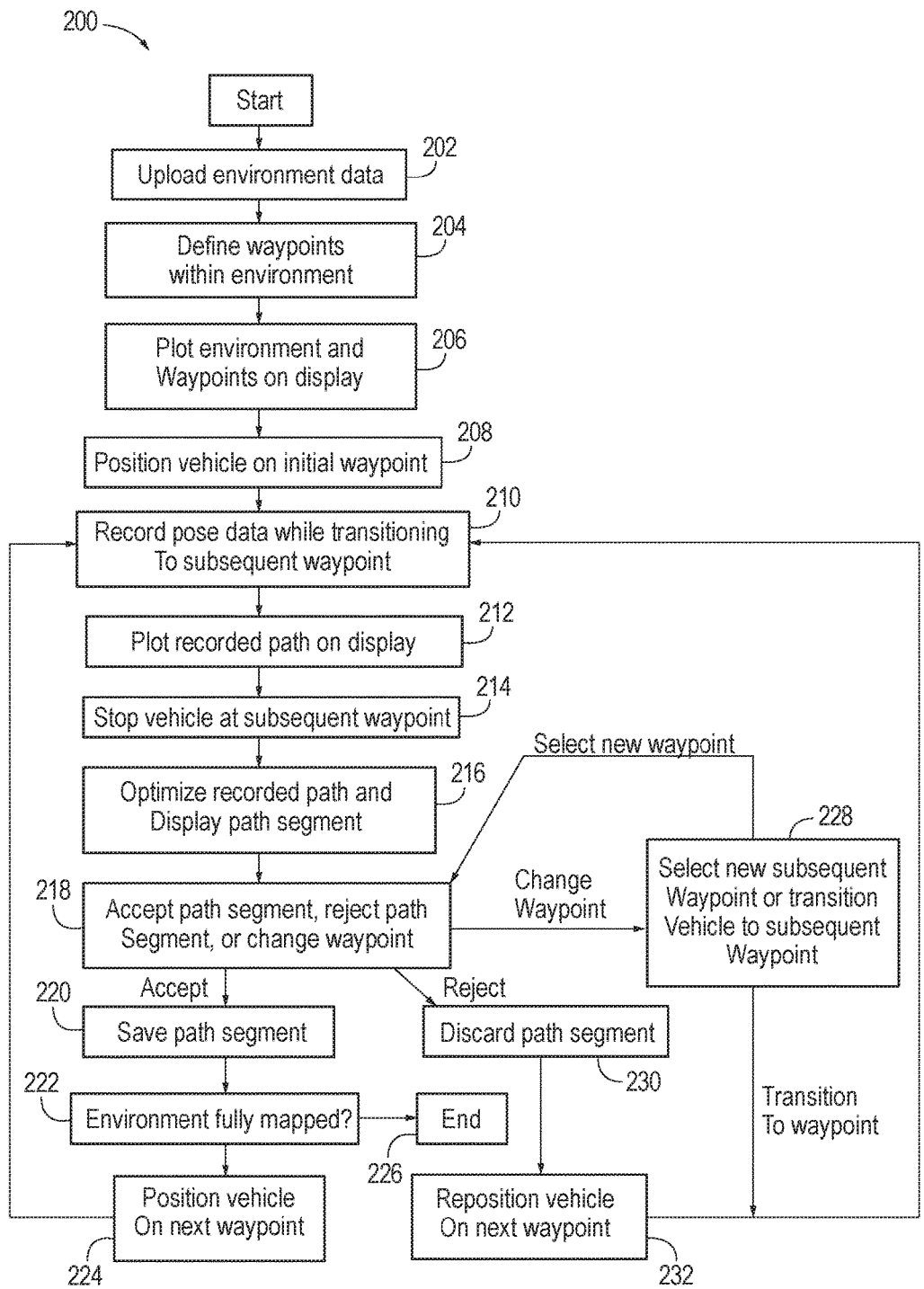
FIG. 4 depicts a flow diagram of a map data collection process employed by a warehouse mapping tool.

FIG. 4 is a flowchart outlining one contemplated way in which map data collection logic (200) may be utilized by a mapping engine to map a warehouse environment. The steps of this flowchart are merely illustrative in nature and, as will be appreciated by those familiar with programmable logic, a variety of alternative logic configurations may be employed to practice the concepts of the present disclosure. At steps (202) and (204), as described above, environmental data and waypoint data are uploaded into a mapping engine, respectively. In some instances, it may not be necessary to upload the environmental data, particularly when it has already been made available to the mapping engine. Further, as seen in step (204) and as will be described in greater detail below, the warehouse mapping tool can be configured to add, discard, and edit the waypoint data uploaded into the mapping engine. Alternatively, the waypoint data may be initially created through the warehouse mapping tool such that no initial waypoint data is uploaded into warehouse mapping tool. At step (206), the uploaded waypoint and environmental data is displayed on a mobile mapping interface. In particular, the mobile mapping interface may include, among other things, a waypoint display window, which is illustrated in FIGS. 5A-5J, and which may comprise a graphical representation of at least a portion of the warehouse environment, any waypoints located within the warehouse environment, and any warehouse obstacles physically present within warehouse environment.

Referring collectively to FIGS. 1, 4, 5A, and 5B, the mobile computing device (110) can be configured to access waypoint data such that, with receipt of the waypoint data, mobile computing device (110) is configured to present a graphical representation of waypoints (12) at their respective discrete locations in the representation of environment (10) on mobile mapping interface (120). In some versions, the waypoint data may reside on mobile computing device (110), rather than on mapping engine (102). Furthermore, mobile computing device (110) can be configured to access the mobile mapping data of mapping vehicle (50) to thereby present a graphical representation of mapping vehicle (50) at its respective location in a representation of environment (10) via the mobile mapping interface (120). Mapping vehicle (50) may be identified on mobile mapping interface (120) by a mapping indicator (16) on mobile mapping interface (120).

Accordingly, waypoint display window (122) may further include a graphical representation of mapping indicator (16) to indicate the designated position of mapping vehicle (50) within warehouse environment (10) such that the location of mapping indicator (16) is continuously updated as a user selectively identifies the current position of mapping vehicle (50) within warehouse environment (10), as seen in step (208) of FIG. 4. In particular, a user identifies the location of mapping vehicle (50) at a particular waypoint (12) via mobile mapping interface (120) at mapping instruction window (134). Mobile computing device (110) is configured to access instructions and/or commands transferred by mapping instruction window (134) to thereby facilitate the mapping of warehouse environment (10). By way of example, as seen in FIGS. 5A-5B and 5D-5E, mapping instruction window (134) provides a user with various command buttons, including "Record a Waypoint" (135), "Show Advanced Entry" (137), "Show Status Log" (138) and select a "Waypoint Number" (139). Other data displayed in mapping instruction window (134) that may be included on mobile mapping interface (120) is a "Waypoint Count" and "Sections" display (133).

Figure 5A:
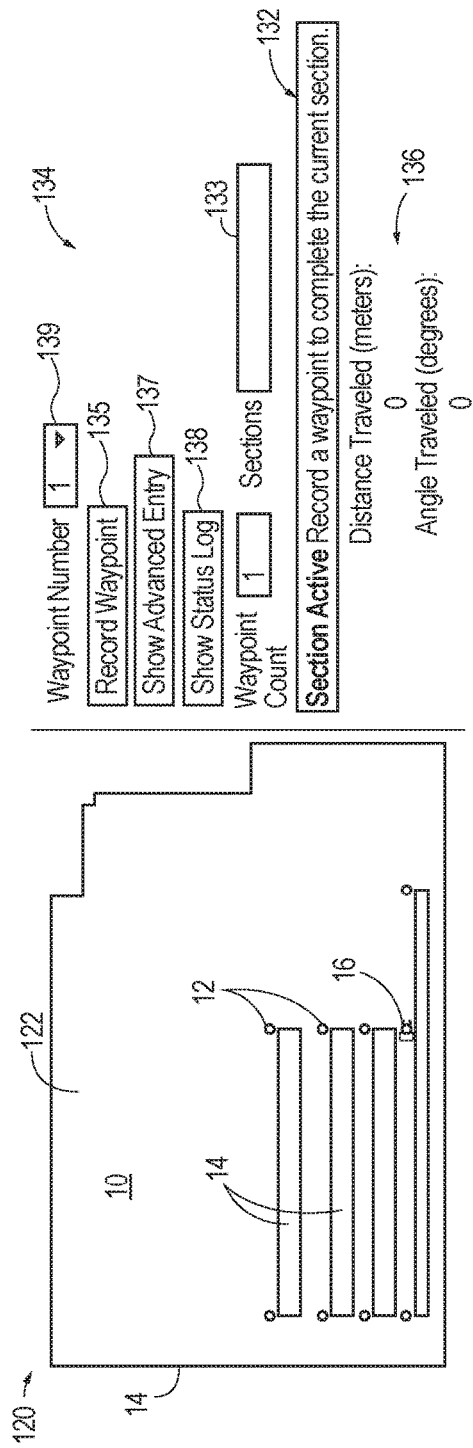
FIG. 5A depicts a graphical user interface of a warehouse mapping tool at a stage where a mapping vehicle is in an active session at an initial waypoint.

The "Waypoint Number" (139) button on mapping instruction window (134) is configured to identify the particular waypoint (12) from the waypoint data set that a user intends to commence mapping procedures at. For instance, as seen in FIG. 5A, waypoint (12) No. 1 has been selected from the waypoint data set in "Waypoint Number" (139) of mapping instruction window (134). Accordingly, mapping indicator (16) is positioned at the corresponding pixel on waypoint display window (122) that represents the location of waypoint (12) No. 1 in warehouse environment (10). Additionally, mobile mapping interface (120) may be configured such that a user may select the intended waypoint (12) by identifying waypoint (12) through waypoint display window (122). In this instance, a user may visually identify the desired waypoint (12) to commence mapping at through waypoint display window (122) and thereby select waypoint (12) by clicking on that waypoint (12). In some embodiments, waypoint display window (122) may comprise touch screen activated elements such that a user may select the intended waypoint (12) by touching the pixel(s) displaying the desired waypoint (12) on waypoint display window (122).

Additional or fewer mapping data options may be included in mapping instruction window (134). In some versions, mobile computing device (110) may be configured to access mapping status data to thereby prompt a user to utilize a particular mapping instruction or command on mapping instruction window (134). As described above, mapping indicator (16) may indicate a current position of mapping vehicle (50), mobile computing device (110), or mapping interface (120). Mapping indicator (16) may be a geometric symbol, vehicle-specific icon, or any selection of colored or non-colored pixels displayed on mobile mapping interface (120) to signify to a user the type of vehicle (50) or mobile computing device (110) being used with warehouse mapping tool (100).

As briefly described above in step (204), mobile mapping interface (120) is configured to present prompts for editing the waypoint data uploaded to warehouse mapping tool (100) such that the waypoint data is dynamic. In this instance, a user is capable of modifying, adding, or discarding location and heading coordinates of the plurality of waypoints (12). Suitable waypoint data typically may comprise location and heading coordinates that define a desired pose for mapping vehicle (50) to have while operating in warehouse environment (10), at geographically significant locations in warehouse environment (10), i.e. waypoints (12). For example, and not by way of limitation, waypoints may be established at the ends and midpoints of warehouse aisles, along appropriate travel paths in a warehouse, near obstacles, hazards, or other special zones in a warehouse, etc. Waypoint data may be gathered and made available to warehouse mapping tool (100) in a variety of ways. For example, and not by way of limitation, waypoint data may be collected using architectural plans, survey data, or any of a variety of GPS, laser, or other sensor-based warehouse survey technologies.

With the data uploaded into mapping engine (102) and the position of mapping vehicle (50) selected via mapping instruction window (134), an active mapping session may be commenced by selecting "Record Waypoint" (135) command on mapping instruction window (134). Mapping engine (102) can be configured to detect when path segment (18) has commenced recording the mobile mapping data based on a user's selection of "Record Waypoint" (135) command via mapping instruction window (134). In this instance, with warehouse mapping tool (100) in an active recording session, mapping vehicle (50) may begin traveling along path segment (18) as seen in FIG. 5A. Although mapping engine (102) is configured to commence recording mobile mapping data of mapping vehicle (50) as mapping vehicle (50) travels along path segment (18), it should be understood that, although possible, path segment (18) need not be mapped and displayed on mobile mapping interface (120) in real time. Rather, it may be preferable to delay the display of path segment (18) until after mapping engine (102) receives an input from a user to cease recording mobile mapping data—which may occur when mapping vehicle (50) reaches the end of the intended path segment (18). Alternatively, in other versions, mapping engine (102) and mobile mapping interface (120) may be configured to progressively map and display path segment (18) as the mobile mapping data of mapping vehicle (50) is recorded. As seen at step (210) of FIG. 4, mapping engine (102) can be configured to record the pose data of mapping vehicle (50) as it travels between two waypoints (12) to thereby estimate the location of mapping vehicle (50). Simultaneously, mapping engine (102) can be configured to generate mobile mapping data by tracking the movement of mapping vehicle (50) along the elapsed travel path segment (18).

Movement of mobile mapping interface (120) and/or mobile computing device (110), which may, for example, be integrated with the hardware of mapping vehicle (50), may be tracked using any of a variety of location tracking technologies to generate the mobile mapping data. By way of example only, suitable location tracking technologies may include, but are not limited to, vehicle odometry or IMU-based tracking technologies, camera-assisted images or other machine vision technologies, GPS technologies, WiFi-based RSSI tracking technologies, RFID or other sensor-based data and location tracking systems. For example, in one embodiment, the location and heading coordinates of mapping vehicle (50), i.e., pose data, are estimated by dead reckoning the recorded odometry of mapping vehicle (50) relative to a user's specified location of mapping vehicle (50) relative to environment (10).

Figure 5B:
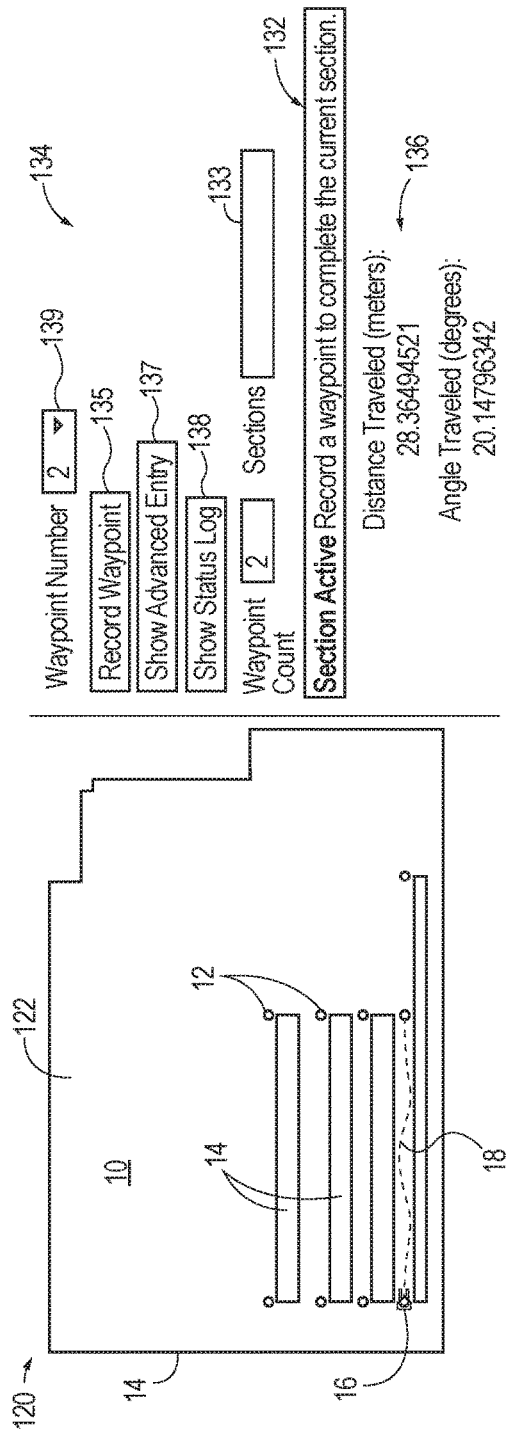
FIG. 5B depicts a graphical user interface of a warehouse mapping tool at a stage where pose data is recorded as a mapping vehicle transitions to a subsequent waypoint during an active session.

Once mapping vehicle (50) travels to a subsequent waypoint (12), mobile computing device (110) can be configured to present a graphical representation of the elapsed travel path segment (18) in waypoint display window (122), as seen at step (212) of FIG. 4, with the graphical representation being overlaid on the representation of waypoints (12) and mapping indicator (16). As described above, path segment (18) is not displayed on waypoint selection window (122) until after mapping vehicle (50) reaches the intended final destination for the current path segment (18). In other embodiments, however, mobile computing device (110) may be configured to present a progressive graphical representation of elapsed travel path segment (18) as mapping vehicle (50) travels between waypoints (12). Warehouse environment (10) is similarly displayed on waypoint display window (122), as seen in FIG. 5B. Warehouse environment (10) is represented as a set of pixels on mobile mapping interface (120) such that waypoints (12) are defined by individually identified pixels in the set of display pixels forming the representation of warehouse environment (10). Mobile mapping interface (120) may comprise a plurality of display pixels. In some embodiments, mobile mapping interface (120) is configured to be touch screen activated such that a user is able to physically interact with waypoint display window (122) to designate a location of mapping indicator (16) at a particular waypoint (12) via "Waypoint Number" (139) command. Recording of the mobile mapping data of mapping vehicle (50) begins when "Record Waypoint" (135) button is selected and terminates when at step (214) of FIG. 4 when "Record Waypoint" (135) button is selected again.

Mobile computing device (110) is configured to access mapping status data during the mapping process of warehouse mapping tool (100) such that mobile computing device (110) is operable to present the mapping status data to mapping status indicator (132) of mobile mapping interface (120). By way of example, as shown in FIGS. 5A-5J, the mapping status data may indicate warehouse mapping tool (100) is in the process of actively mapping path segment (18) by designating a "Section Active" graphical prompt, or to indicate that warehouse mapping tool (100) has completed mapping path segment (18) by displaying a "Section Complete" graphical prompt to a user at mapping status indicator (132). The mapping status data, i.e., the aforementioned graphical prompts, which are communicated to mapping status indicator (132), can be generated by mapping engine (102).

A seen in FIGS. 5A-5B and 5D-5E, mobile mapping interface (120) may further include progressive mapping feedback indicators (136) during an active mapping session. In particular, progressive mapping feedback indicators (136) such as the cumulative distance traveled by mapping vehicle (50) along elapsed travel path segment (18) and the cumulative angle traveled by mapping vehicle between the two waypoints (12) may be progressively displayed on mobile mapping interface (120) for real-time review by a user. As will be described in greater detail below, some or all of the metrics displayed in progressive mapping feedback indicators (136) may ultimately be utilized by mapping engine (102) to calculate the error metric data that is later displayed on error metric indicator (140).

Figure 5C:
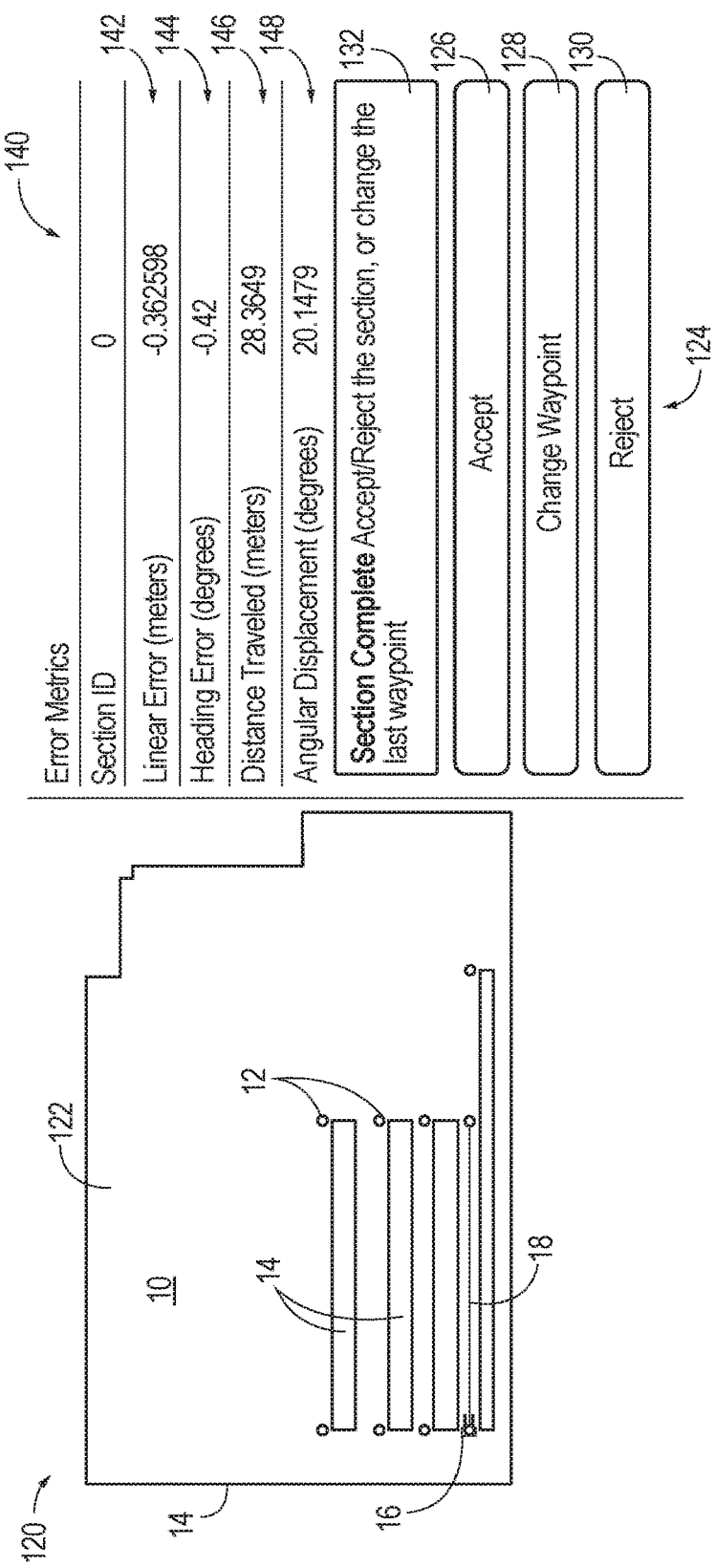
FIG. 5C depicts a graphical user interface of a warehouse mapping tool at a stage where an active session is completed and a mapping vehicle is positioned at the correct waypoint.

At step (216), the path segment (18) can be analyzed and optimized by mapping engine (102) to thereby create an optimal path segment (18) extending between the initial waypoint (12) and the subsequent waypoint (12), as seen in FIGS. 5B-5C. In particular, mapping engine (102) accounts for the error metric data recorded from elapsed travel path segment (18) and thereby adjusts the distance traveled and angular displacement experienced during path segment (18) to generate optimal path segment (18). As will be described in greater detail below, mapping engine (102) is further configured to account for additional error metric data when optimizing elapsed travel path segments (18).

In this instance, as seen at step (218) of FIG. 4, warehouse mapping tool (100) presents a user with a determination step. In particular, mobile mapping interface (120) may comprise a validation portal (124), a mapping status indicator (132), and an error metric indicator (140). As will be appreciated by those familiar with user interfaces, particularly graphical user interfaces, the recitation or description herein of a user interface comprising specific elements does not require all elements to be visible at the same time, on the same screen. For example, the same user interface may comprise the distinct elements of FIGS. 5A and 5C, even though some of these elements might not be visible on the same screen, at the same time.

Error metric indicator (140) may include a graphical representation of various data captured in response to the operation of warehouse mapping tool (100). In particular, error metric indicator (140) may comprise a graphical representation of error metric data computed by mapping engine (102) during the transition of mapping vehicle (50) between waypoints (12). This graphical representation may merely be a numerical representation of the data itself, a symbolic representation of the data, or any other type of visually discernable representation of the data. With the waypoint data uploaded into mapping engine (102), mapping engine (102) is operable to perform error metric data analysis by comparing the waypoint data to the mobile mapping data received from mapping vehicle (50). In other words, mapping engine (102) is configured to generate the error metric data that is ultimately accessed by mobile computing device (110) and displayed by mobile mapping interface (120) to a user by comparing the location and heading coordinates of the mobile mapping data to the corresponding location and heading coordinates of the waypoint data. Mapping engine (102) generates the error metric data by calculating error values based on a comparison of the recorded path segment (18) and the waypoint data of environment (10).

As best seen in FIGS. 5C-5J, error metric indicator (140) may comprise a plurality of distinct error metric fields, including a linear error (142), a heading error (144), a distance traveled (146), and an angular displacement (148). Other suitable combinations of error metric data may be included on error metric indicator (140). Linear error (142) is configured to indicate a linear distance between a starting or terminal point of the elapsed travel path segment (18), e.g., an initial waypoint (12) of the set of waypoints (12), and the location coordinates of a selected waypoint (12) identified by a user via mobile mapping interface (120). Heading error (144) can be configured to indicate a heading measurement at a starting or terminal point of the elapsed travel path segment (18), e.g., an initial waypoint (12) of the set of waypoints (12), and the heading coordinates of a selected waypoint (12) identified by a user. Distance traveled (146) can be configured to indicate a cumulative travel distance made by mapping vehicle (50) along the current elapsed travel path segment (18). Angular displacement (148) can be configured to indicate a cumulative angular displacement of mapping vehicle (50) along that particular elapsed travel path segment (18).

The error metric data displayed on error metric indicator (140) may include both quantitative components (as described above) and qualitative components as seen in FIG. 5C. By way of example, error metric indicator (140) provides a quantitative representation, in the form of a numerical representation of error values (142, 144, 146, 148), when the error value computed exceeds a predetermined threshold. Additionally or alternatively, error metric indicator (140) may provide a qualitative representation, in the form of a color alert (150) in error metric indicator (140), when the error value exceeds the predetermined threshold. Color alert (150) of error metric indicator (140) may include a change in background color, a repeating flash of color (e.g., a flashing red background color), or other visual indicators on mobile mapping interface (120). In this instance, as seen in FIG. 5C, error metric indicator (140) is absent of qualitative representations indicating an error value (142, 144, 146, 148) exceeding a predetermined threshold such that a user is informed that the quantitative components (142, 144, 146, 148) are all within an acceptable threshold to the waypoint data. Accordingly, a user will seek to accept the generated path segment (18) at step (218) of FIG. 4.

To accomplish this, a user accesses validation portal (124) of mobile mapping interface (120). Validation portal (124), as best seen in FIGS. 5C-5J, may comprise a plurality of touch screen activated elements (126, 128, 130) for a user of mobile mapping interface (120) to utilize when operating warehouse mapping tool (100). In the present example, the plurality of activated elements (126, 128, 130) may include an "Accept" button (126), a "Reject" button (128), and a "Change Waypoint" button (130). Buttons (126, 128, 130) are configured to transfer an accept, reject, or change waypoint command, respectively, to mobile computing device (110) pursuant to a determination by a user, upon reviewing the error metric data provided via error metric indicator (140), that the previously recorded path segment (18) has been adequately mapped. In other words, a user may designate the proper determination of whether to accept, reject, or change a recently recorded path segment (18) via buttons (126, 128, 130) per the data displayed on error metric indicator (140) for a user's consideration. Accordingly, validation portal (124) is configured to transfer an "Accept," "Reject" and "Change Waypoint" command from a user to mobile computing device (110). Additionally, mapping engine (102) is configured to cooperate with validation portal (124) to suggest entry of a corresponding command based on the error metric data. In some versions, validation portal (124) may comprise an audio interface that is configured to transfer the accept, reject, and/or change waypoint commands in verbal form such a user is able to communicate the adequacy determination of a recently recorded path segment (18) to mobile computing device (110) by verbal command.

In this instance, a user accepts path segment (18) at step (220) to thereby save path segment (18). Mapping engine (102) is configured to process the command transferred from mobile mapping interface (120) via mobile computing device (110) to thereby return instructions to mobile computing device (110) indicating a validation state of the elapsed travel path segment (18) based on the command that was transferred to mapping engine (102). Accordingly, the appearance, e.g., color, style, visibility, transparency, etc., of path segment (18) may differ on mobile mapping interface (120) dependent on the command received by mapping engine (102). Mobile computing device (110) may be configured to present elapsed travel path segment (18) as a solid line in waypoint display window (122) in response to the accept command. It should be understood that elapsed travel path segment (18) may be displayed as a line of varying complexity based on the estimated travel path of mapping vehicle (50) within environment (10), including, but not limited to, simple linear or curved lines, or more complex combinations of linear, curved, and irregular lines.

Figure 5D:
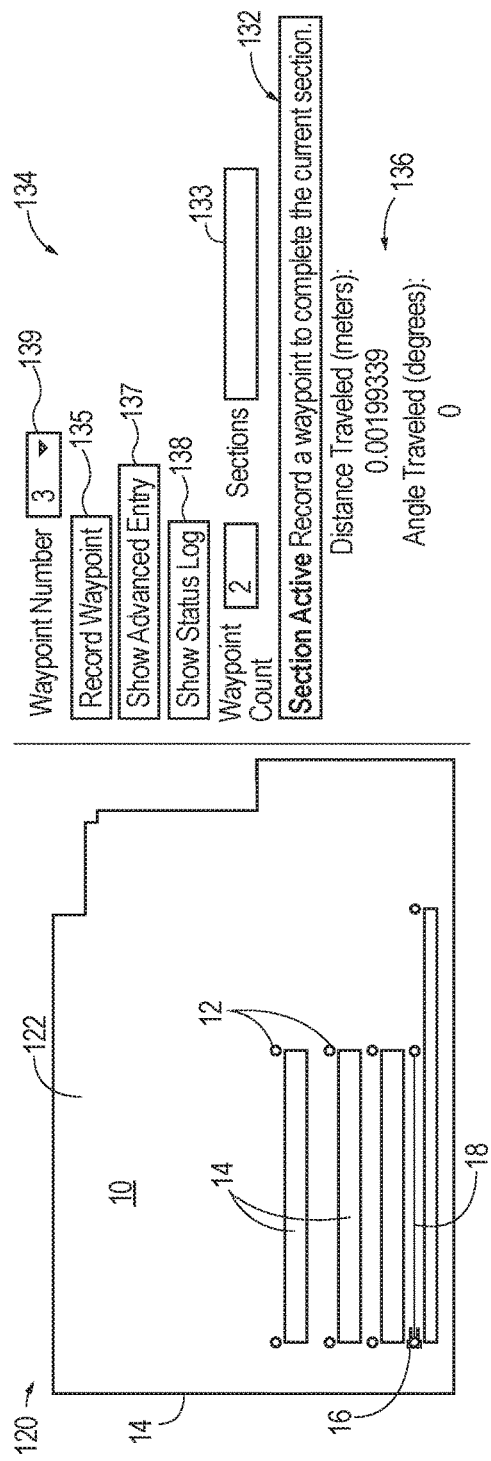
FIG. 5D depicts a graphical user interface of a warehouse mapping tool at a stage where pose data is recorded as a mapping vehicle transitions to a subsequent waypoint during another active session.

In practicing the concepts of the present disclosure, it is noteworthy that some mapping tasks may involve mapping an entire warehouse environment, while others may merely require a portion of the environment to be mapped, e.g., a set of selected aisles in a warehouse with several aisles. In the example where only a set of selected aisles are to be mapped, waypoints can be identified for those selected aisles, while excluding identification of waypoints for other aisles in the warehouse environment. Referring to step (222), if additional waypoints (12) remain to be mapped within environment (10), a user selects "Accept" button (126) to thereby activate a new mapping session as seen in FIG. 5D. In this instance, a user is required to identify a next waypoint (12) for mapping vehicle (50) to commence a new path segment (18) at, as seen in step (224) of FIG. 4. In the present example shown in FIG. 5D, a user selects the former subsequent waypoint (12) that concluded the former path segment (18) as the new initial waypoint (12) for the new path segment (18). In this instance, the map data collection logic (200) of mapping engine (102) returns to step (210) to perform the operating sequence again for the new path segment (18). In the event the user has completed mapping a desired portion of the warehouse environment (10), or when the warehouse environment (10) is fully mapped, a user inputs such determination into mobile mapping interface (120) to thereby transmit an end sequence to mapping engine (102) via mobile computing device (110) as seen at step (226) of FIG. 4.

Figure 5E:
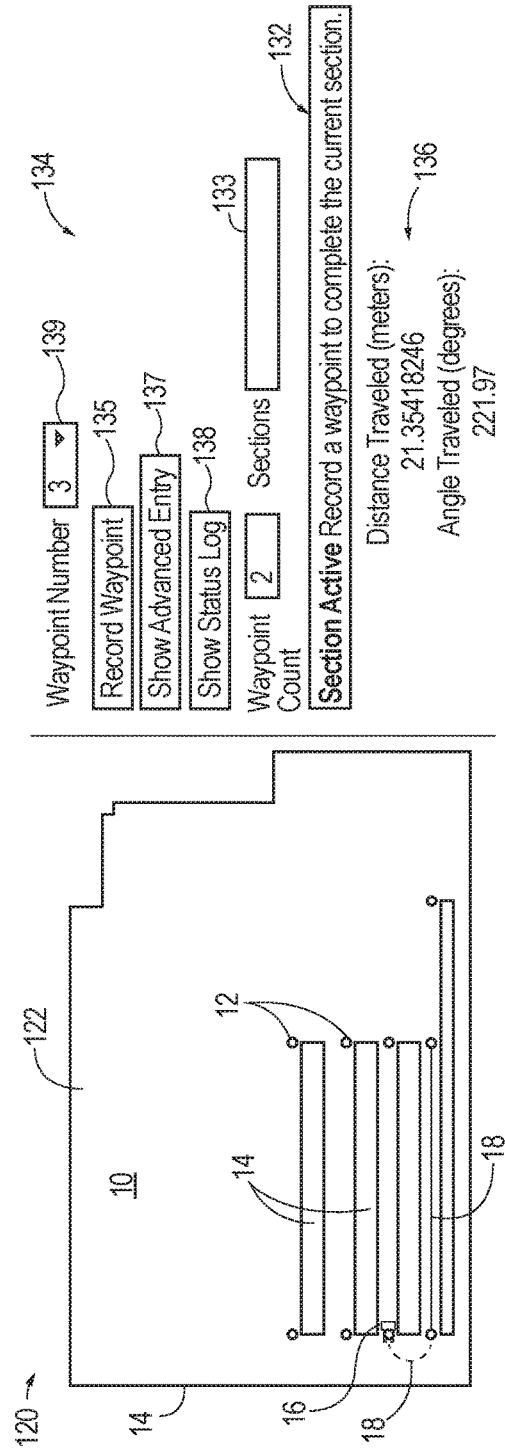
FIG. 5E depicts a graphical user interface of a warehouse mapping tool at a stage where pose data is recorded as the mapping vehicle reaches a subsequent waypoint.
Figure 5F:
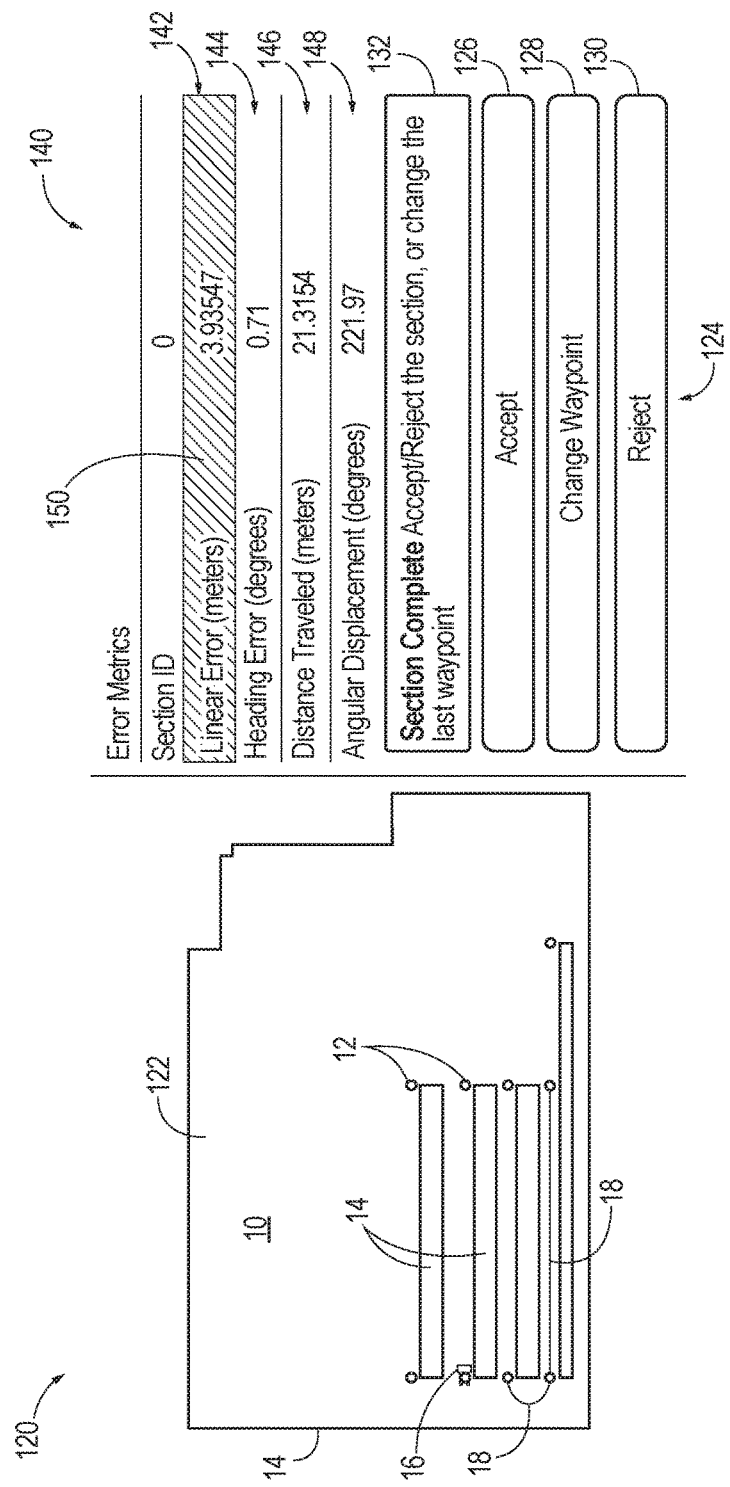
FIG. 5F depicts a graphical user interface of a warehouse mapping tool at a stage where an active session is completed and the mapping vehicle is positioned at an incorrect subsequent waypoint.

FIG. 5E shows mapping vehicle (50) reaching subsequent waypoint (12) of the new path segment (18). FIG. 5F illustrates an instance where a user inadvertently identifies a different subsequent waypoint (12) than the actual subsequent waypoint (12) at which the mapping vehicle (50) concluded path segment (18). Mapping engine (102) generates the error metric data by calculating a linear error value (142) representing a linear distance of mapping vehicle (50) between a terminal point of the elapsed travel path segment (18) and the location coordinates of a selected waypoint (12). Mapping engine (102) further generates a heading error value (144) that represents an angular difference between a heading measurement of mapping vehicle (50) at a terminal point of the elapsed travel path segment (18) and the heading coordinates of a selected waypoint (18). Additionally, mapping engine (102) can be configured to compute a distance traveled (146) and an angular displacement (148) of mapping vehicle (50) while traveling along path segment (18). The distance traveled value (146) represents a cumulative traveled distance while the angular displacement value (148) represents a cumulative angular displacement.

As briefly described above, mapping engine (102) can be further configured to generate error messages as part of the error metric data displayed on error metric indicator (140) of mobile mapping interface (120). In particular, mapping engine (102) can be programmed to store a predetermined threshold value for one or more of the individual error metric data values such that mapping engine (102) is operable to indicate to a user through mobile mapping interface (120) when one of the error metric data values exceeds the corresponding threshold value. The error message generated by mapping engine (102) may be in the form of a visual, audible, or other form suitable for alerting a user to the error message. As seen in FIG. 5F, error metric indicator (140) of mobile mapping interface (120) may include an error message in the form of a visual indication that the linear error (142) computed by mapping engine (102) exceeds the predetermined error threshold for the particular waypoint (12) at which the mapping vehicle (50) is identified. In this instance, a user is prompted by validation portal (124) to determine an appropriate action via buttons (126, 128, 130). In some versions, mapping engine (102) is configured to automatically reject the recently recorded path segment (18) when one or more of the error thresholds are exceeded. In contrast, mapping engine (102) may further be configured to automatically accept path segment (18) when none of the error metric data (142, 144, 146, 148) exceed the respective threshold.

Figure 5G:
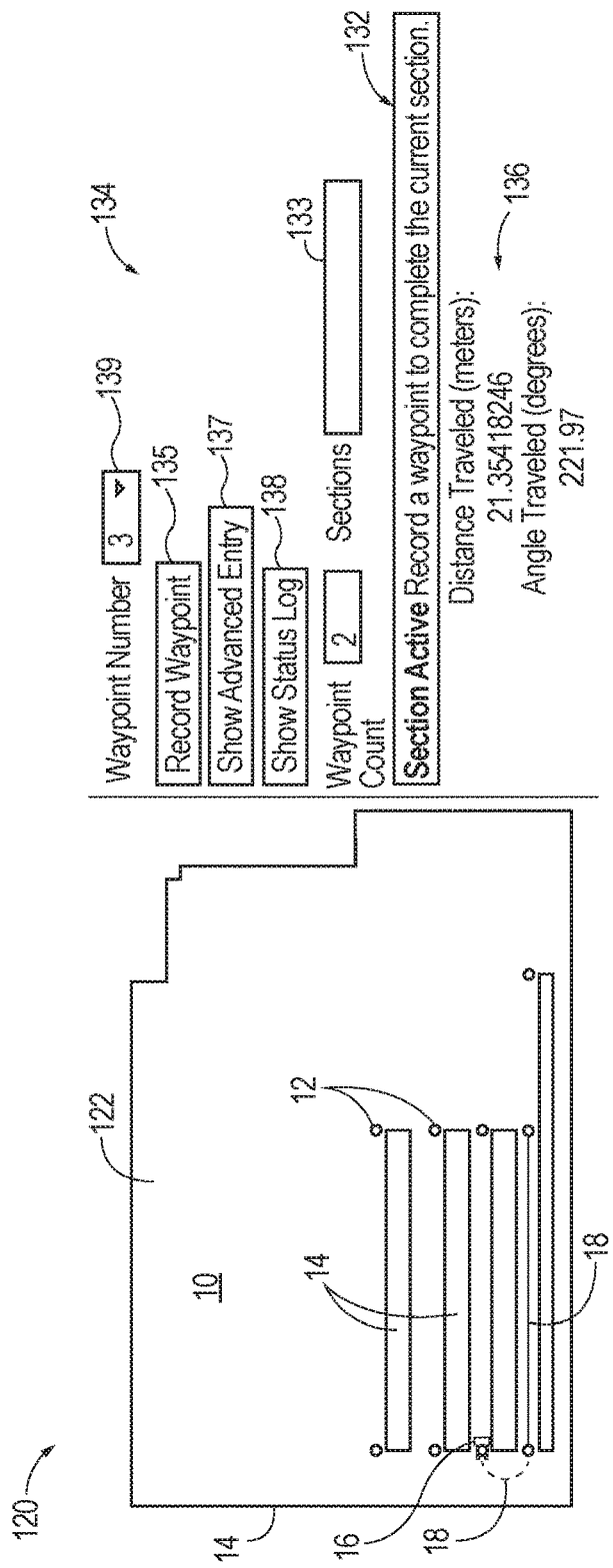
FIG. 5G depicts a graphical user interface of a warehouse mapping tool at a stage where the mapping tool is returned to an active session.

With error metric indicator (140) of mobile mapping interface (120) providing a linear error (142) and color alert (150), a user is likely to determine that rejecting or changing the waypoint are the appropriate options to consider at step (218) of FIG. 4. As seen in FIG. 5G, the "Change Waypoint" button on validation portal (124) can be configured to resume the active session of path segment (18) to thereby allow a user to continue operating mapping vehicle (50) and/or to identify a different, subsequent waypoint (12) as the correct terminal point of mapping vehicle (50), as seen in step (228) of FIG. 4. In other words, mapping engine (102) is configured to register a new waypoint (12) for generation in response to the transfer of the change waypoint command based on the error metric data.

Figure 5H:
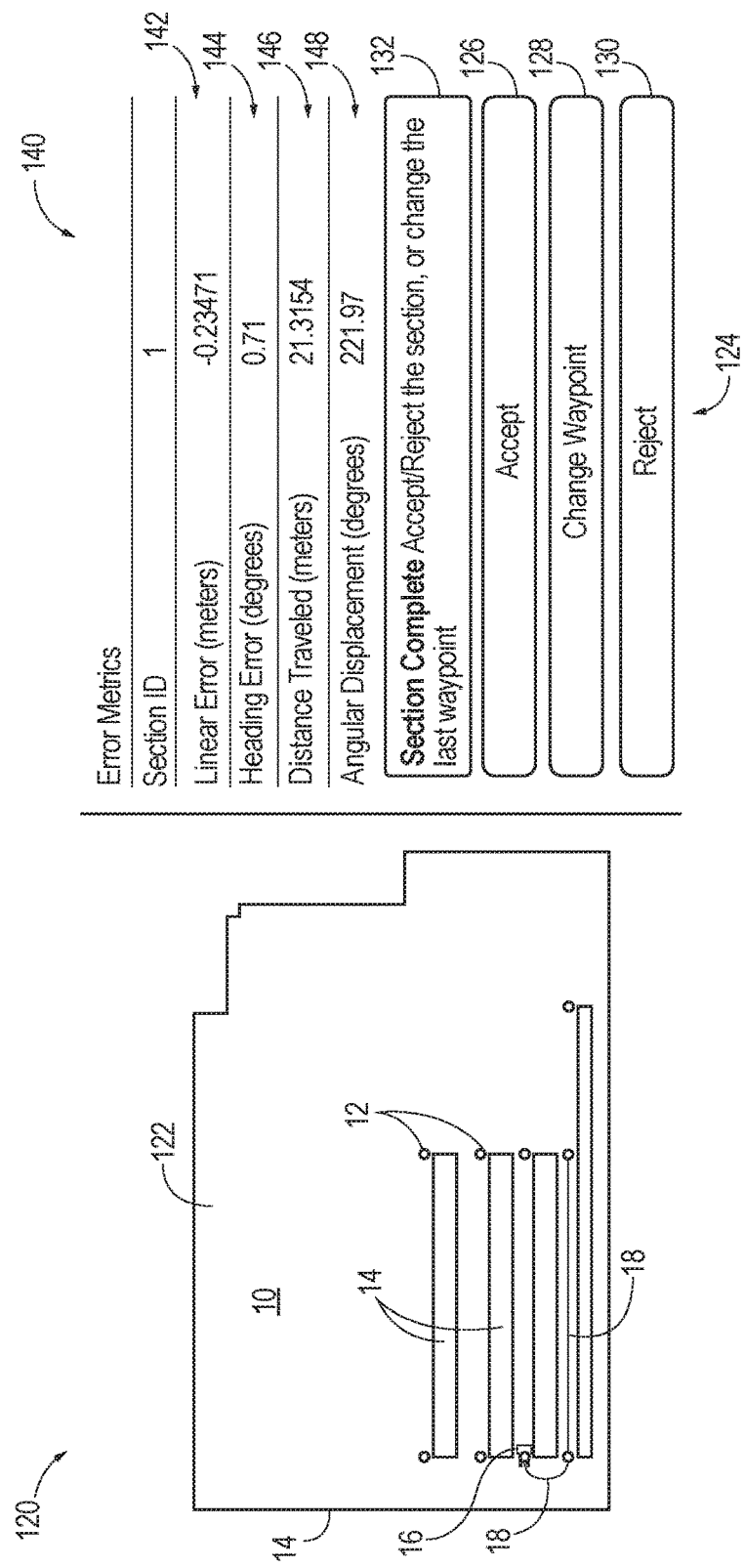
FIG. 5H depicts a graphical user interface of a warehouse mapping tool at a stage where an active session is completed and a mapping vehicle is positioned at a correct subsequent waypoint.

In this instance, as seen in FIG. 5H, the user's selection of a different, subsequent waypoint (12) provides for updated error metric data at error metric indicator (140) thereby leading mapping engine (102) to compute the analysis again with the different waypoint (12) data. As indicated by the lack of color alerts (150) at error metric indicator (140), a user becomes informed that error values (142, 144, 146, 148) are within their respective thresholds. Accordingly, selecting the "Accept" button (126) on the validation portal (124) will provide for the acceptance of the current path segment (18) and the initiation of the new path segment (18). It should be understood that the map data collection logic (200) of mapping engine (102) may be configured such that the new path segment (18) may be automatically initiated with the former, subsequent waypoint (12) identified as the new, initial waypoint (12) for the newly initiated path segment (18).

Figure 5I:
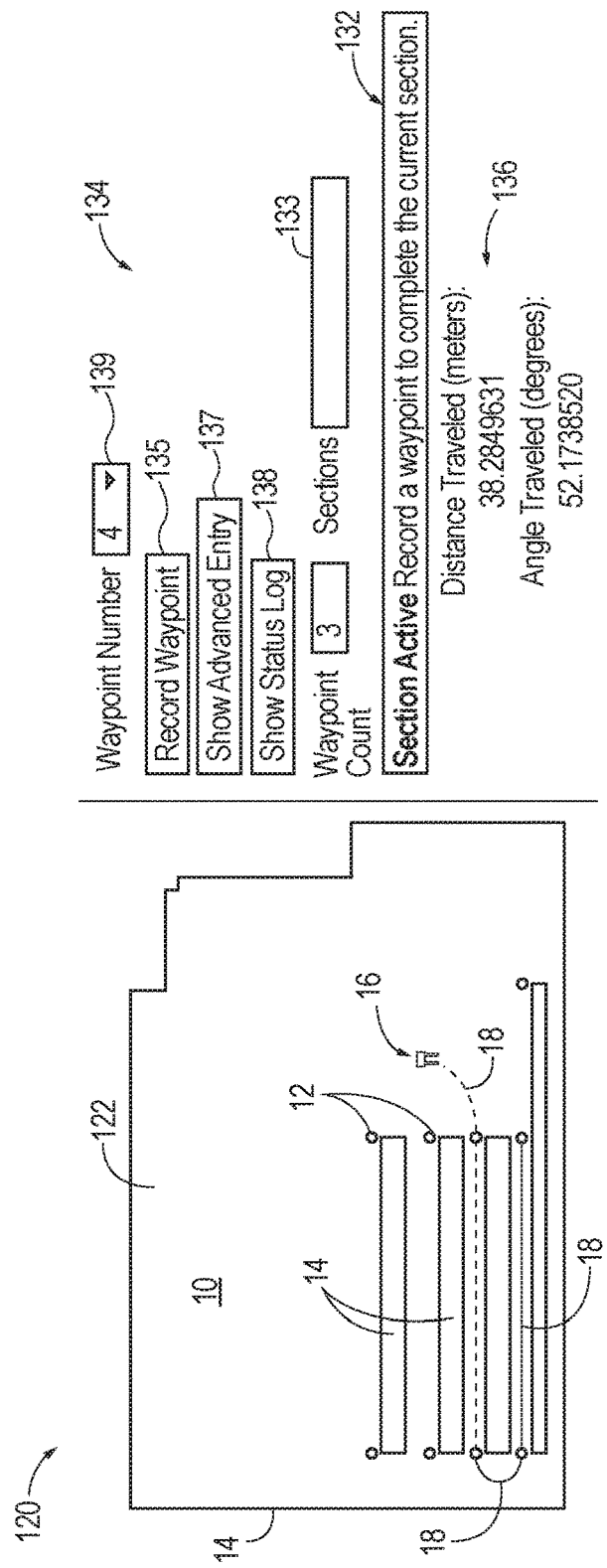
FIG. 5I depicts a graphical user interface at a stage where pose data is recorded as a mapping vehicle transitions to a subsequent waypoint during another active session.

FIG. 5I shows mapping indicator (16), representing mapping vehicle (50) on waypoint display window (122), surpassing the subsequent waypoint (12) such that the new path segment (18) terminates beyond the subsequent waypoint (12). Upon selecting the subsequent waypoint (12) as the terminal point of path segment (18), mapping engine (102) computes the error metric data by comparing the mobile mapping data retrieved from mapping vehicle (50) with the waypoint data prior to alerting the user of an error. With access to both the waypoint data of warehouse environment (10) and the mobile mapping data of mapping vehicle (50), mobile computing device (110) is operable to access the error metric data generated by mapping engine (102). The error metric data may comprise comparing the mobile mapping data and the waypoint data together for accuracy. In particular, the mobile mapping data is analyzed in relation to the uploaded waypoint data by comparing the location and orientation of the identified waypoints (12) that a user has designated as the starting and stopping locations of mapping vehicle (50) during the elapsed travel path segment (18) to the location and orientation of mapping vehicle (50) according to the recorded mobile mapping data. Once the error metric data is computed by mapping engine (102), mobile computing device (110) is configured to present a graphical representation of the error metric data on mobile mapping interface (120) for analysis by a user. In this instance, at the conclusion of each path segment (18) mobile computing device (110) is configured to indicate a validation state of the recently generated path segment (18) on mobile mapping interface (120) for a user to review and respond to via a validation portal (124).

Figure 5J:
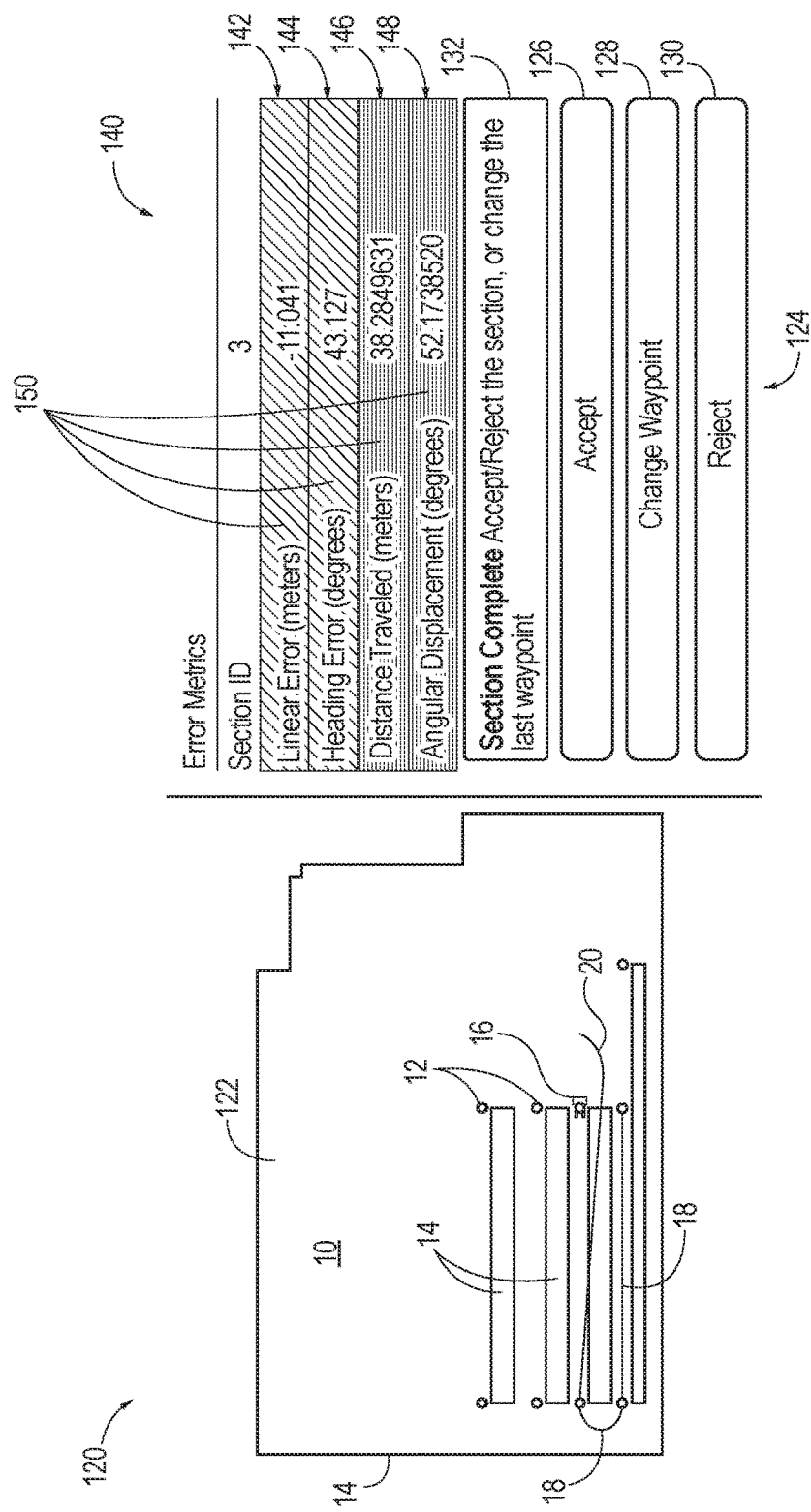
FIG. 5J depicts a graphical user interface of a warehouse mapping tool at a stage where an active session is completed and a mapping vehicle is not positioned at an identified waypoint.

As seen in FIG. 5J, error metric indicator (140) may include multiple alerts, including indications that linear error (142), heading error (144), distance traveled (146), and angular displacement (148) have all exceeded their predetermined thresholds, respectively. The alerts are further signified by color alerts (150). In this instance, mapping engine (102) is configured to modify the orientation of path segment (18) about the initial waypoint (12) to thereby reposition the terminal point of path segment (18) as close to the identified, subsequent waypoint (12) as possible without modifying the mobile mapping data transmitted from mapping vehicle (50) to mapping engine (102), which data may, for example, include the length and configuration of path segment (18).

Figure 6:
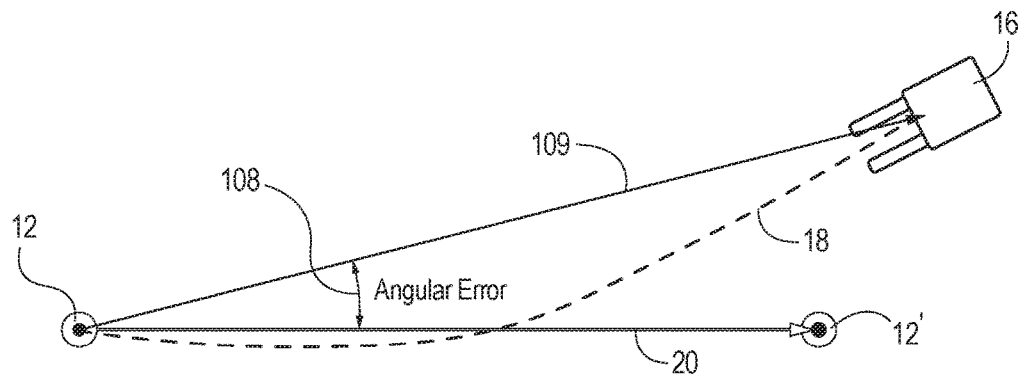
FIG. 6 depicts a schematic diagram showing a graphical representation of a mapping vehicle surpassing a targeted, subsequent waypoint, and the associated angular error.
Figure 7:
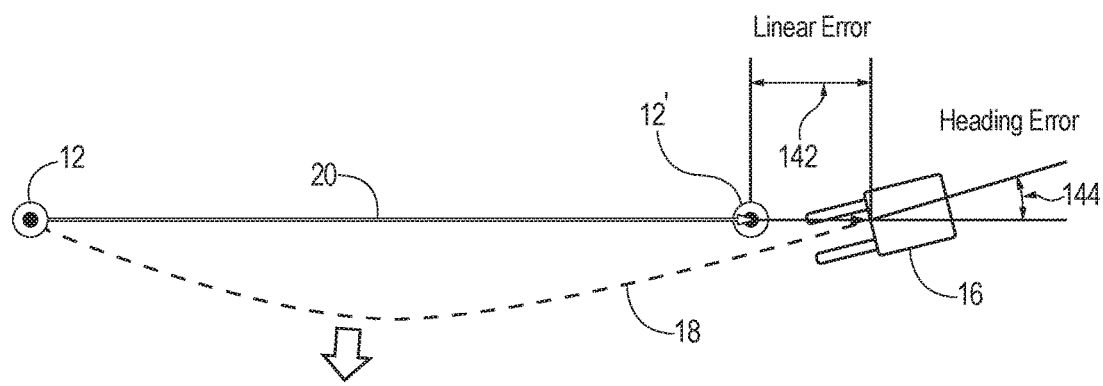
FIG. 7 depicts a schematic diagram showing a graphical representation of the mapping vehicle of FIG. 6 being repositioned adjacent to a targeted-subsequent waypoint according to the angular error of FIG. 6, with a linear and heading error defining the variance between the mapping vehicle and the targeted-subsequent waypoint.

In this instance, as best seen in FIGS. 6-7, the aforementioned mapping engine can be configured to calculate an angular error (108) between a straight-line vector (109) and an optimal path segment (20). In particular, straight-line vector (109) extends between initial waypoint (12) and the terminal point of elapsed travel path segment (18). The optimal path segment (20) extends between the initial waypoint (12) and a subsequent waypoint (12') identified by the user as the terminal point of the elapsed travel path segment. In this instance, the mapping engine is configured to correct the elapsed travel path segment (18) to account for the calculated angular error (108) and thereby enable the terminal point of the path segment (18) to be repositioned to better approximate the distance traveled and the angular displacement over the elapsed travel path segment (18). As is illustrated in FIG. 7, this allows the mapping engine to compute the aforementioned linear error (142) and heading error (144) at the subsequent waypoint (12') based on the corrected positioning of the mapping indicator (16) within the warehouse environment.

In other words, the mapping engine optimizes the path segment (18) by using sensor input from the mobile mapping data to calculate angular error over the elapsed travel path (18) as it transitions from the initial waypoint (12) to the subsequent waypoint (12'). The mapping engine is configured to thereby combine the calculated angular error with odometry measurements to optimize path segment (18), which process may include an assumption that there was a measurement error in the initial heading of the mapping vehicle at the initial waypoint (12). Accordingly, the initial heading of mapping vehicle (50) at initial waypoint (12) may be corrected using the angular error (108) to calculate the ideal starting heading that would position the mapping vehicle and the terminal point of elapsed travel path segment (18) as close to the identified, subsequent waypoint (12') as possible. It should be understood that the optimization process explained above does not need to involve modifying the cumulative distance traveled or the cumulative angle traveled by mapping vehicle (50), but may merely use a correction to the starting heading coordinate of mapping vehicle at initial waypoint (12).

In this instance, despite the optimization of path segment (18), the terminal point of elapsed travel path segment (18) still exceeds the identified, subsequent waypoint (12) thereby providing the error values (142, 144, 146, 148) seen at error metric indicator (140), as seen in FIG. 5J. Accordingly, at step (218) of FIG. 4, a user is likely to identify the "Reject" button (128) on validation portal (124) as the appropriate determination on how to record elapsed travel path segment (18). In this instance, path segment (18) is discarded as seen at step (230) such that the mapping vehicle must be repositioned to a next, initial waypoint (12) to thereby initiate a new path segment (18), as seen at step (232) of FIG. 4. Discarded path segment (18), as seen in FIG. 5J, may remain visible on waypoint display window (122) of mobile mapping interface (120). Alternatively, mobile mapping interface (120) may be configured such that the discarded path segment (18) changes color, style, transparency, or is removed entirely to distinguish the discarded status of path segment (18) relative to accepted path segments (18) displayed on waypoint display window (122). Other suitable visual indications to identify the discarded path segment (18) on waypoint display window (122) may be utilized.

The aforementioned mapping tools are described in detail below and can be used to define a travel path in an industrial environment, which travel path may be utilized by vehicles navigating the environment in a fully or semi-autonomous manner. The mapping tools contemplated herein enable environmental mapping without the need for extensive environmental surveys or extensive modifications or additions to the environment itself. Given a valid travel path segment, or a collection of contiguous or non-contiguous travel path segments, fully or partially autonomous industrial vehicles can use these segment(s) for navigation, localization, odometry correction, and other types of operations related to the location or heading of the industrial vehicle.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A warehouse mapping tool comprising a mobile mapping interface and a mobile computing device in communication with the mobile mapping interface, wherein:

the mobile mapping interface comprises
- a waypoint display window comprising a graphical representation of at least a portion of a warehouse environment,
- an error metric indicator, and
- a validation portal that is configured to transfer "accept" and "reject" commands from a user to the mobile computing device; and the mobile computing device is configured to
- access waypoint data comprising location and heading coordinates of a set of mapping waypoints,
- present graphical representations of the set of mapping waypoints at discrete locations in the representation of the warehouse environment in the waypoint display window of the mobile mapping interface,
- access mobile mapping data comprising location and heading coordinates representing an elapsed travel path segment associated with the mobile computing device, the mobile mapping interface, or both, in relation to the warehouse environment,
- present the elapsed travel path segment in the waypoint display window of the mobile mapping interface,
- access error metric data representing a comparison of the mobile mapping data and the waypoint data,
- present a graphical representation of the error metric data at the error metric indicator of the mobile mapping interface, and
- indicate a validation state of the elapsed travel path segment in the waypoint display window in response to the transfer of the "accept" and "reject" commands to the mobile computing device.

2. The warehouse mapping tool of claim 1, wherein:
the warehouse mapping tool further comprises a mapping vehicle; and
the error metric data accessed by the mobile computing device represents a comparison of the location and heading coordinates of the set of mapping waypoints to the location and heading coordinates of the mapping vehicle.

3. The warehouse mapping tool of claim 2, wherein the mobile mapping interface and the mobile computing device are secured to, positioned to move with, or integrated with hardware of the mapping vehicle.

4. The warehouse mapping tool of claim 3, wherein:
the mapping tool further comprises a mapping engine configured to generate the mobile mapping data that is accessed by the mobile computing device mobile mapping interface; and
the mapping engine is secured to, positioned to move with, or integrated with hardware of the mapping vehicle.

5. The warehouse mapping tool of claim 2, wherein:
the mobile mapping interface and the mobile computing device are displaced from the mapping vehicle;
the mapping tool further comprises a mapping engine configured to generate the mobile mapping data that is accessed by the mobile computing device mobile mapping interface; and
the mapping engine resides in a complementary remote computer.

6. The warehouse mapping tool of claim 5, wherein the complementary remote computer is configured as a warehouse management system.

7. The warehouse mapping tool of claim 1, wherein:
the graphical representation of the warehouse environment comprises a set of display pixels; and
the set of mapping waypoints are defined by selected pixels in the set of display pixels forming the representation of the warehouse environment.

8. The warehouse mapping tool of claim 1, wherein the graphical representation of the error metric data at the error metric indicator includes quantitative and qualitative components.

9. The warehouse mapping tool of claim 1, wherein the error metric indicator of the mobile mapping interface comprises a plurality of distinct error metric fields, wherein the distinct error metric fields are selected from:
- linear error, representing a linear distance between a terminal point of the elapsed travel path segment and the location coordinates of a selected waypoint of the set of mapping waypoints;
- heading error, representing a heading measurement at a terminal point of the elapsed travel path segment and the heading coordinates of a selected waypoint of the set of mapping waypoints;
- distance traveled, representing cumulative travel distance along the elapsed travel path segment;
- angular displacement, representing cumulative angular displacement along the elapsed travel path segment; or
- combinations thereof.

10. The warehouse mapping tool of claim 1, wherein:
the mobile mapping interface further comprises a mapping status indicator; and
the mobile computing device is configured to access mapping status data and present the mapping status data at the mapping status indicator.

11. The warehouse mapping tool of claim 1, wherein the waypoint data resides on the mobile computing device.

12. The warehouse mapping tool of claim 1, wherein the warehouse mapping tool comprises a mapping engine and the waypoint data resides in the mapping engine.

13. The warehouse mapping tool of claim 12, wherein:
the waypoint data residing in the mapping engine is dynamic; and
the user interface comprises prompts for editing the waypoint data.

14. The warehouse mapping tool of claim 1, wherein:
the mapping tool further comprising a mapping engine; and
the mapping engine is configured to generate the mobile mapping data that is accessed by the mobile computing device.

15. The warehouse mapping tool of claim 14, wherein the mapping engine is configured to generate the mobile mapping data by tracking movement of the mobile mapping interface, the mobile computing device, or both, along the elapsed travel path segment.

16. The warehouse mapping tool of claim 14, wherein the mapping engine generates the error metric data by comparing location and heading coordinates of the mobile mapping data to location and heading coordinates of the waypoint data.

17. The warehouse mapping tool of claim 14, wherein the mapping engine generates the error metric data by calculating:
- a linear error value representing a linear distance between a terminal point of the elapsed travel path segment and the location coordinates of a selected waypoint of the set of mapping waypoints;
- a heading error value representing an angular difference between a heading measurement at a terminal point of the elapsed travel path segment and the heading coordinates of a selected waypoint of the set of mapping waypoints;
a distance traveled value representing cumulative travel distance along the elapsed travel path segment;
an angular displacement value, representing cumulative angular displacement along the elapsed travel path segment; or
combinations thereof.

18. The warehouse mapping tool of claim 14, wherein:
the validation portal is configured to transfer a "change waypoint" command from a user to the mobile computing device; and
the mapping engine is configured to (i) cooperate with the validation portal to suggest entry of "change waypoint" command based on the error metric data, (ii) register a new waypoint for generation of the error metric data in response to the transfer of the "change waypoint" command, or (iii) both.

19. The warehouse mapping tool of claim 14, wherein the mapping engine is configured to process the "accept" and "reject" commands transferred from the mobile computing device and return instructions to the mobile computing device to indicate the validation state of the elapsed travel path segment based on whether an "accept" or "reject" command is transferred from the mobile computing device.

20. The warehouse mapping tool of claim 1, wherein the mapping tool further comprises a mapping engine that is configured to:
generate the error metric data that is accessed by the mobile computing device; and
optimize the elapsed travel path segment to account for the error metric data.

21. The warehouse mapping tool of claim 1, wherein the mobile computing device is configured to:
present the elapsed travel path segment as a line in the waypoint display window; and
indicate a validation state of the elapsed travel path segment in the waypoint display window by changing the color, style, or visibility of the line.

22. The warehouse mapping tool of claim 1, further comprising a mapping engine, wherein the mobile mapping interface, the mobile computing device, and the mapping engine are configured to:
present a graphical prompt at the mobile mapping interface to select a mapping waypoint;
present a graphical prompt at the mobile mapping interface to initiate mapping;
record a path segment in response to a "record waypoint" command at the mobile mapping interface;
present a graphical prompt at the mobile mapping interface to conclude mapping;
display the path segment in the waypoint display window;
present the error metric data at the error metric data indicator;
present a graphical prompt at the mobile mapping interface to transfer the "accept" command; and
store the elapsed travel path segment in response to the "accept" command.

23. The warehouse mapping tool of claim 1, wherein the mapping tool further comprises a mapping engine, wherein the mobile mapping interface, the mobile computing device and the mapping engine are configured to:
present a graphical prompt at the mobile mapping interface to select a mapping waypoint;
present a graphical prompt at the mobile mapping interface to initiate mapping;
record a path segment in response to a "record waypoint" command at the mobile mapping interface;
present a graphical prompt at the mobile mapping interface to conclude mapping;
display the path segment in the waypoint display window;
present the error metric data at the error metric data indicator;
present a graphical prompt at the mobile mapping interface to transfer the "accept" command; and
record a subsequent path segment in response to the "accept" command at the mobile mapping interface.

24. The warehouse mapping tool of claim 1, wherein the mapping tool further comprises a mapping engine, wherein the mobile mapping interface, the mobile computing device and the mapping engine are configured to:
present a graphical prompt at the mobile mapping interface to select a mapping waypoint;
present a graphical prompt at the mobile mapping interface to initiate mapping;
record a path segment in response to a "record waypoint" command at the mobile mapping interface;
present a graphical prompt at the mobile mapping interface to conclude mapping;
display the path segment in the waypoint display window;
present the error metric data with an error alert at the error metric data indicator;
present a graphical prompt at the mobile mapping interface to transfer the "reject" command; and
discard the elapsed travel path segment in response to the "reject" command.

25. The warehouse mapping tool of claim 1, wherein the mapping tool further comprises a mapping engine, wherein the mobile mapping interface, the mobile computing device and the mapping engine are configured to:
present a graphical prompt at the mobile mapping interface to select a mapping waypoint;
present a graphical prompt at the mobile mapping interface to initiate mapping;
record a path segment in response to a "record waypoint" command at the mobile mapping interface;
present a graphical prompt at the mobile mapping interface to conclude mapping;
display the path segment in the waypoint display window;
present the error metric data with an error alert at the error metric data indicator;
present a graphical prompt at the mobile mapping interface to transfer the "change waypoint" command; and
resume recording the path segment in response to the "Change Waypoint" command and displaying the progressing path segment in the waypoint selection window.

26. A mapping vehicle comprising the warehouse mapping tool of claim 1.

27. An industrial environment mapping tool comprising a mobile mapping interface and a mobile computing device in communication with the mobile mapping interface, wherein:
the mobile mapping interface comprises
a waypoint display window comprising a graphical representation of at least a portion of an industrial environment,
an error metric indicator, and
a validation portal that is configured to transfer "accept" and "reject" commands from a user to the mobile computing device; and
the mobile computing device is configured to
access waypoint data comprising location coordinates of a set of mapping waypoints, present graphical representations of the set of mapping waypoints at discrete locations in the representation of the industrial environment in the waypoint display window of the mobile mapping interface, access mobile mapping data representing an elapsed travel path segment associated with a mapping vehicle, the mobile computing device, or the mobile mapping interface in relation to the industrial environment, access error metric data representing a comparison of the mobile mapping data and the waypoint data, present a graphical representation of the error metric data at the error metric indicator of the mobile mapping interface, and indicate a validation state of the elapsed travel path segment in the waypoint display window in response to the transfer of the "accept" and "reject" commands to the mobile computing device.

28. A warehouse mapping tool comprising a complementary remote computer configured to communicate with a mapping vehicle, wherein:

the complementary remote computer comprises a mapping interface and a mapping engine;

the mapping interface comprises
a waypoint display window comprising a graphical representation of at least a portion of a warehouse environment,
an error metric indicator, and
a validation portal that is configured to transfer "accept" and "reject" commands from a user to the mapping engine; and the complementary remote computer is configured to
access waypoint data comprising location and heading coordinates of a set of mapping waypoints,
present graphical representations of the set of mapping waypoints at discrete locations in the representation of the warehouse environment in the waypoint display window of the mapping interface,
access mobile mapping data comprising location and heading coordinates representing an elapsed travel path segment associated with the mapping vehicle in relation to the warehouse environment,
present the elapsed travel path segment in the waypoint display window of the mapping interface,
access error metric data representing a comparison of the mobile mapping data and the waypoint data,
present a graphical representation of the error metric data at the error metric indicator of the mapping interface, and
indicate a validation state of the elapsed travel path segment in the waypoint display window in response to the transfer of the "accept" and "reject" commands.

29. The warehouse mapping tool of claim 28 wherein the complementary remote computer is configured as a warehouse management system and is further configured to coordinate warehouse operations of industrial vehicles in the warehouse environment with one or more elapsed travel path segments validated by the mapping tool.

30. The warehouse mapping tool of claim 28 wherein the complementary remote computer is configured as a warehouse management system and is further configured to facilitate navigation, localization, or odometry correction with respect to an industrial vehicle in the warehouse environment by referring to one or more elapsed travel path segments validated by the mapping tool.

* * * * *